United States Patent [19]
Tsuji et al.

[11] Patent Number: 5,870,232
[45] Date of Patent: Feb. 9, 1999

[54] ZOOM LENS ARRANGEMENT INCLUDING ENDLESS CAM SURFACE AND PLURALITY OF CAM FOLLOWERS

[75] Inventors: Kanji Tsuji; Akihiro Namai, both of Kanagawa-ken, Japan

[73] Assignee: Canon Kabushiki Kaisha, Tokyo, Japan

[21] Appl. No.: 955,304

[22] Filed: Oct. 21, 1997

Related U.S. Application Data

[63] Continuation of Ser. No. 593,868, Jan. 30, 1996, abandoned.

[30] Foreign Application Priority Data

| Feb. 8, 1995 | [JP] | Japan | ...................................... 7-043596 |
| Feb. 8, 1995 | [JP] | Japan | ...................................... 7-043599 |

[51] Int. Cl.⁶ .................................................. G02B 15/14
[52] U.S. Cl. ........................................... 359/700; 359/699
[58] Field of Search ....................... 359/699, 700, 359/701, 822, 823

[56] References Cited

U.S. PATENT DOCUMENTS

| 3,503,675 | 3/1970 | Muller ..................................... 359/700 |
| 3,715,929 | 2/1973 | Konigslehne et al. ................... 359/700 |
| 4,179,191 | 12/1979 | Freudenschuss ........................ 359/699 |
| 4,322,151 | 3/1982 | Weiss ....................................... 396/72 |
| 4,576,446 | 3/1986 | Kamata .................................... 359/699 |
| 4,993,815 | 2/1991 | Yamazaki ................................. 359/699 |
| 5,037,187 | 8/1991 | Oda .......................................... 359/699 |
| 5,144,493 | 9/1992 | Nomura ................................... 359/700 |
| 5,151,729 | 9/1992 | Takayama ........................... 354/195.12 |
| 5,218,479 | 6/1993 | Chiou ....................................... 359/700 |
| 5,469,300 | 11/1995 | Nomura ................................... 359/700 |
| 5,485,315 | 1/1996 | Nomura ................................... 359/701 |
| 5,488,513 | 1/1996 | Tanaka ..................................... 359/699 |
| 5,506,731 | 4/1996 | Smiley ..................................... 359/822 |
| 5,586,467 | 12/1996 | Weber ......................................... 74/57 |

FOREIGN PATENT DOCUMENTS 5-100144  4/1993  Japan .

*Primary Examiner*—Georgia Epps
*Assistant Examiner*—Ricky Mack
*Attorney, Agent, or Firm*—Fitzpatrick, Cella, Harper & Scinto

[57] ABSTRACT

A lens barrel comprises a first lens group, a cam tube provided with a cam, a plurality of engagement members arranged to move integrally with the first lens group and engaged with a plurality of cam parts of the cam, and a moving member for moving the cam tube along an optical axis with a rotation of the cam tube, wherein a cam part with which at least one engagement member of the plurality of engagement members is engaged is connected to a cam part with which an engagement member adjacent to the at least one engagement member is engaged.

25 Claims, 13 Drawing Sheets

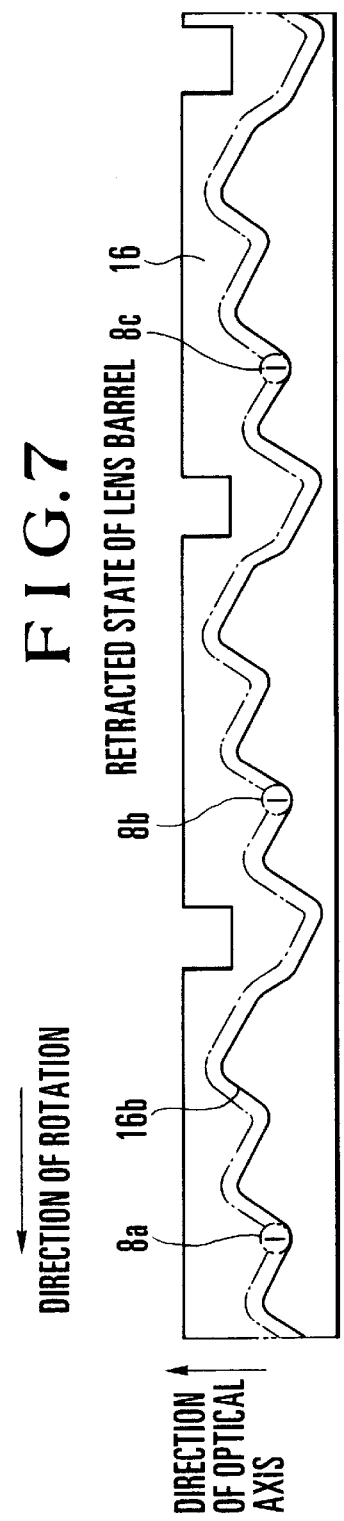
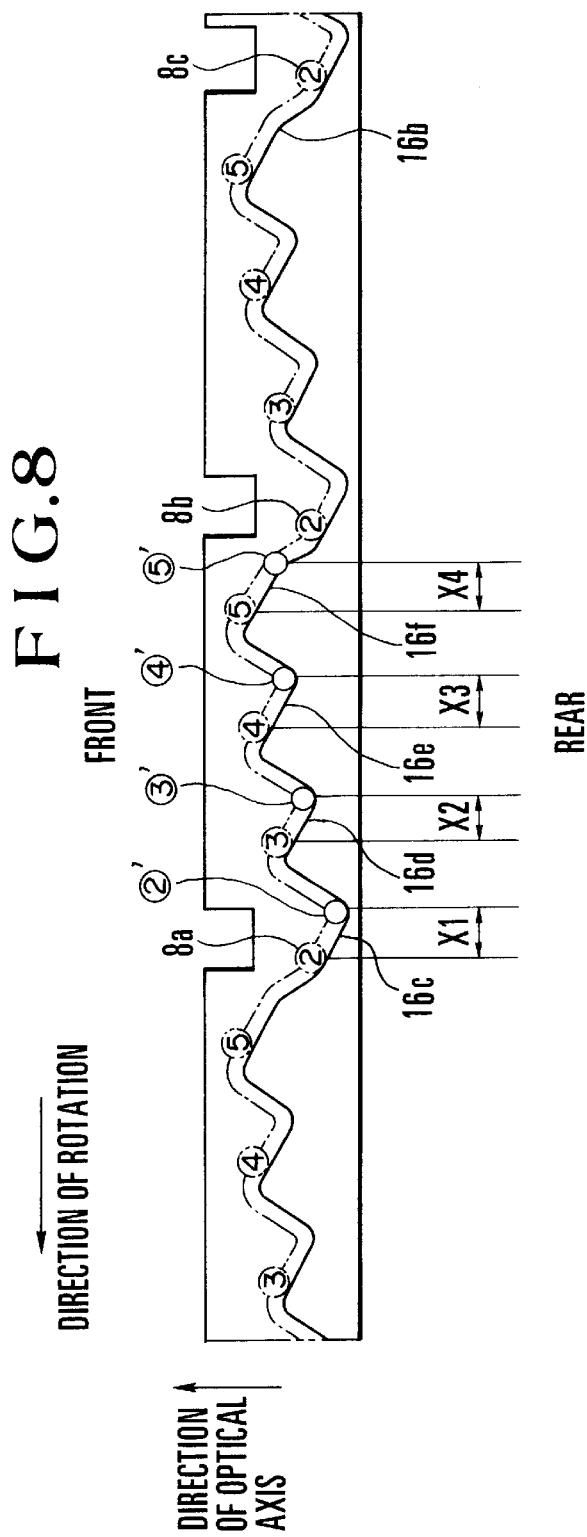

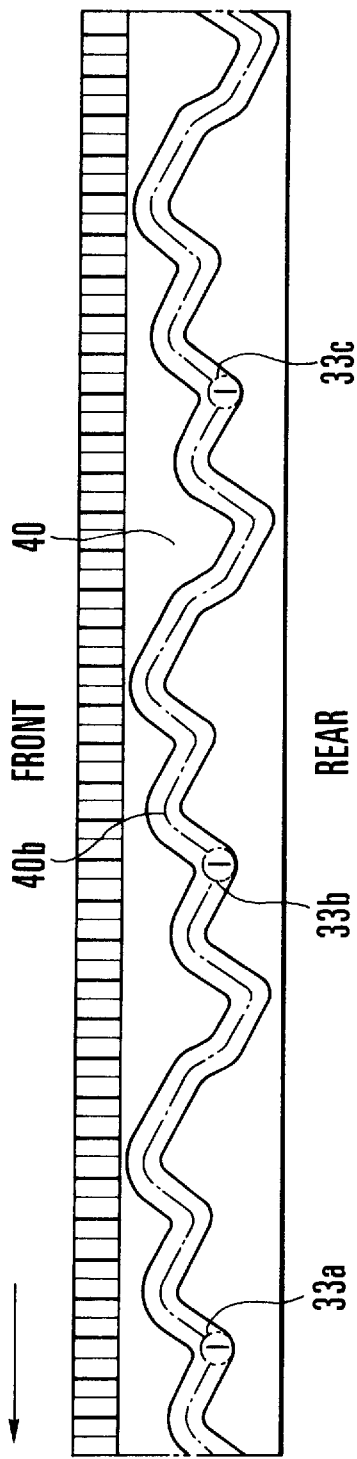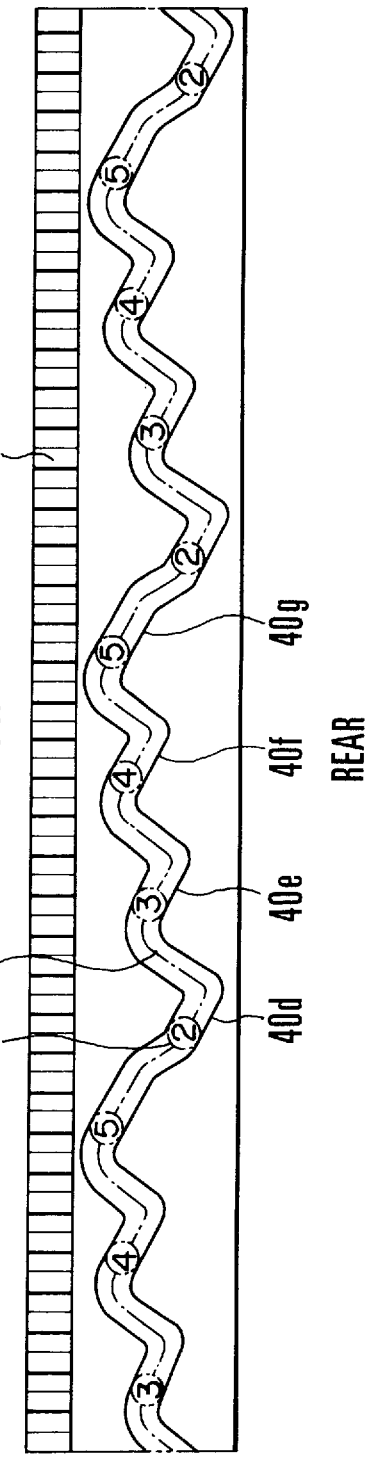

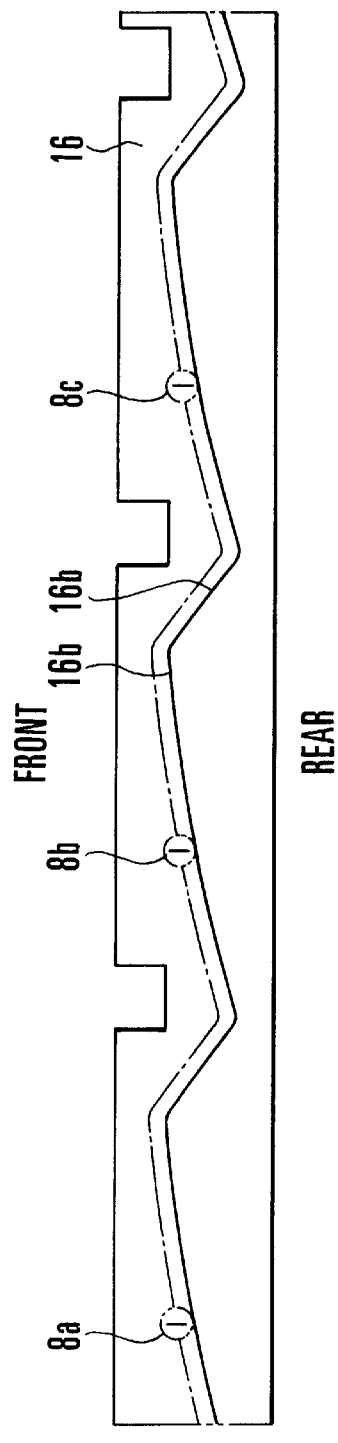

ZOOM LENS ARRANGEMENT INCLUDING ENDLESS CAM SURFACE AND PLURALITY OF CAM FOLLOWERS

This application is a continuation of application Ser. No. 08/593,868 filed Jan. 30, 1996, now abandoned.

BACKGROUND OF THE INVENTION

1. Field of the Invention

The present invention generally relates to a lens barrel and an optical apparatus employing the same and, more particularly, to a lens barrel and an optical apparatus which are capable of readily effecting a focusing operation at each predetermined zoom position and which are suitable for use in a portable video or still camera or the like, the entire size of which can be reduced by retracting its zoom lens barrel into its camera body when no photography is performed.

2. Description of the Related Art

Various lens barrels provided with zoom functions have heretofore been proposed.

FIG. 16 is a schematic cross-sectional view of the essential portion of the lens barrel proposed in Japanese Laid-Open Patent Application No. Hei 5-100144. In the lens barrel shown in FIG. 16, a cam tube 101 is rotatably connected to the inside-diameter portion of a fixed tube 100 by the engagement between helicoid parts, and there is provided a lens barrel block having a zoom motor 102 for causing the cam tube 101 to rotate. The lens barrel block is provided with an external tube 103 which extends from the front of the lens barrel to cover part of the fixed tube 100 at all times. A body 108 is provided with a lens barrel cover 109 which covers part of the external tube 103 at all times.

The cam tube 101 is provided with second lens group cams 101a, 101b and 101c. During zooming, a holder 104 of a second lens group L2 is forced against the second lens group cams 101a, 101b and 101c by the urging force of a spring 107, and rectilinearly travels along the optical axis with respect to a bottom base plate 106 by a key 105.

During this time, with the rotation of the cam tube 101, a first lens group L1 rectilinearly travels by a predetermined number of leads of a female helicoid part 100a of the fixed tube 100, while the second lens group L2 moves with respect to the first lens group L1 by a predetermined lift of each of the second lens group cams 101a, 101b and 101c. Accordingly, the first lens group L1 and the second lens group L2 travel forward while varying the space therebetween. A two-lens-group type of zoom lens is constructed in the above-described manner.

FIG. 17 is a schematic exploded view of the inside face of the cam tube 101 of FIG. 16. As shown in FIG. 17, three cam pins 104a, 104b and 104c provided on the holder 104 of the second lens group L2 respectively correspond to the three cams 110a, 101b and 101 provided on the inside-diameter portion of the cam tube 101.

Accordingly, in the conventional lens barrel shown in FIG. 16, by the three independent cams 101a, 101b and 101c, the relative position between the first and second lens groups L1 and L2 along the optical axis is determined in the area between a telephoto end and a barrel-retracted end at which the lens barrel is retracted into a camera body when no photography is performed.

For this reason, if the second lens group cams 101a, 101b and 101c are to be formed so that each of them can be prevented from interfering with the adjacent cam, it has been necessary to enlarge the diameter of the cam tube 101. Also, the amount of rotation of the cam tube 101 is restricted to the range of each of the formed cams, so that the amount by which the entire lens barrel can travel along the optical axis tends to be reduced.

SUMMARY OF THE INVENTION

It is, therefore, one object of the present invention to provide a lens barrel which makes it possible to readily reduce the entire size of a camera with the lens barrel being retracted, and also makes it possible to appropriately ensure the amount by which a travelling tube travels along the optical axis according to the rotation of a cam tube, as well as to provide an optical apparatus which employs such a lens barrel.

To achieve the above object, according to one aspect of the present invention, there is provided a lens barrel which comprises a first lens group, a cam tube provided with a cam, a plurality of engagement members arranged to move integrally with the first lens group and engaged with a plurality of cam parts of the cam, moving means for moving the cam tube along an optical axis with a rotation of the cam tube, wherein a cam part with which at least one engagement member of the plurality of engagement members is engaged is connected to a cam part with which an engagement member adjacent to the at least one engagement member is engaged.

In the lens barrel according to the aforesaid aspect, it is preferable that the cam is continuously formed over an angle of 360 degrees.

According to another aspect of the present invention, there is provided a lens barrel which comprises a first lens group, a cam tube having a cam continuously formed to extend over an angle of 360 degrees, and moving means for moving the cam tube along an optical axis with a rotation of the cam tube, wherein the first lens group travels along the cam with the rotation of the cam tube.

The lens barrel according to each of the aforesaid aspects of the present invention further comprises a second lens group and a fixed tube, and it is preferable that the moving means moves the cam tube to cause the first and second lens groups to travel with respect to the fixed tube.

In the lens barrel according to each of the aforesaid aspects of the present invention, the fixed tube has a first helicoid part on its inside-diameter portion, the cam tube has on its outside-diameter portion a second helicoid part engaged with the first helicoid part, and the moving means includes the first helicoid part and the second helicoid part.

The lens barrel according to the present invention, further comprises zoom-position detecting means and rotation detecting means for detecting the rotation of the cam tube.

The lens barrel according to the present invention, further comprises a rectilinear groove for limiting the rotation of the first lens group.

By using the lens barrel according to the present invention for an optical apparatus such as a camera, it is possible to provide a light-weight and compact apparatus.

The above and other aspects of the present invention will become apparent from the following detailed description of preferred embodiments of the present invention, taken in conjunction with the accompanying drawings.

BRIEF DESCRIPTION OF THE DRAWINGS

FIG. 7 is a schematic exploded view of the inside face of the cam tube used in the first embodiment;

FIG. 8 is a schematic exploded view of the inside face of the cam Lube used in the first embodiment;

FIG. 12 is a schematic exploded view of the inside face of the cam tube used in the second embodiment;

FIG. 13 is a schematic exploded view of the inside face of the cam tube used in the second embodiment;

FIG. 14 is a schematic exploded view of the inside face of the cam tube used in a third embodiment;

FIG. 15 is a schematic exploded view of the inside face of the cam tube used in the third embodiment;

DETAILED DESCRIPTION OF THE PREFERRED EMBODIMENTS

Figure 1:
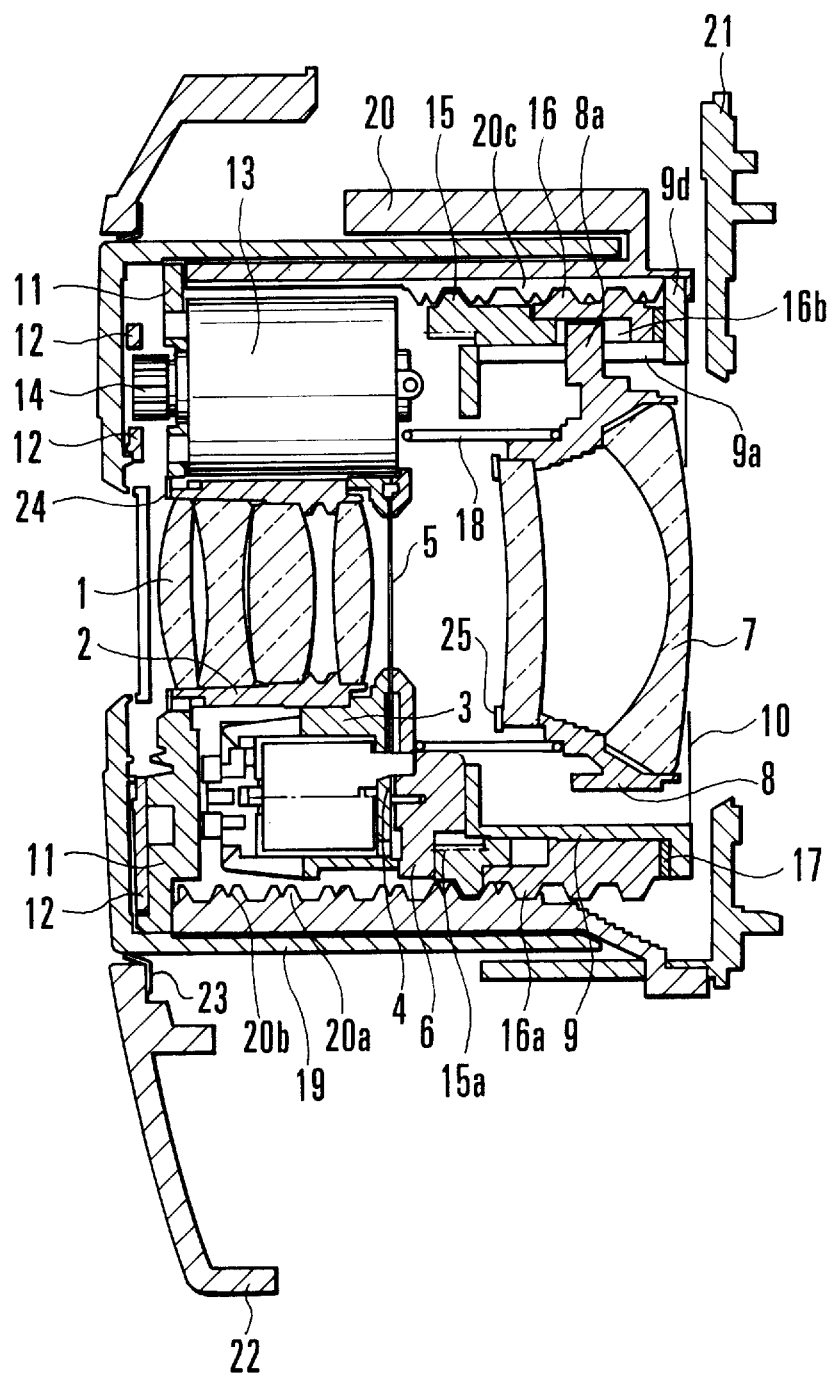
FIG. 1, is a diagrammatic cross-sectional view of the essential portion of a first embodiment of the present invention, showing the retracted state of a lens barrel.
Figure 2:
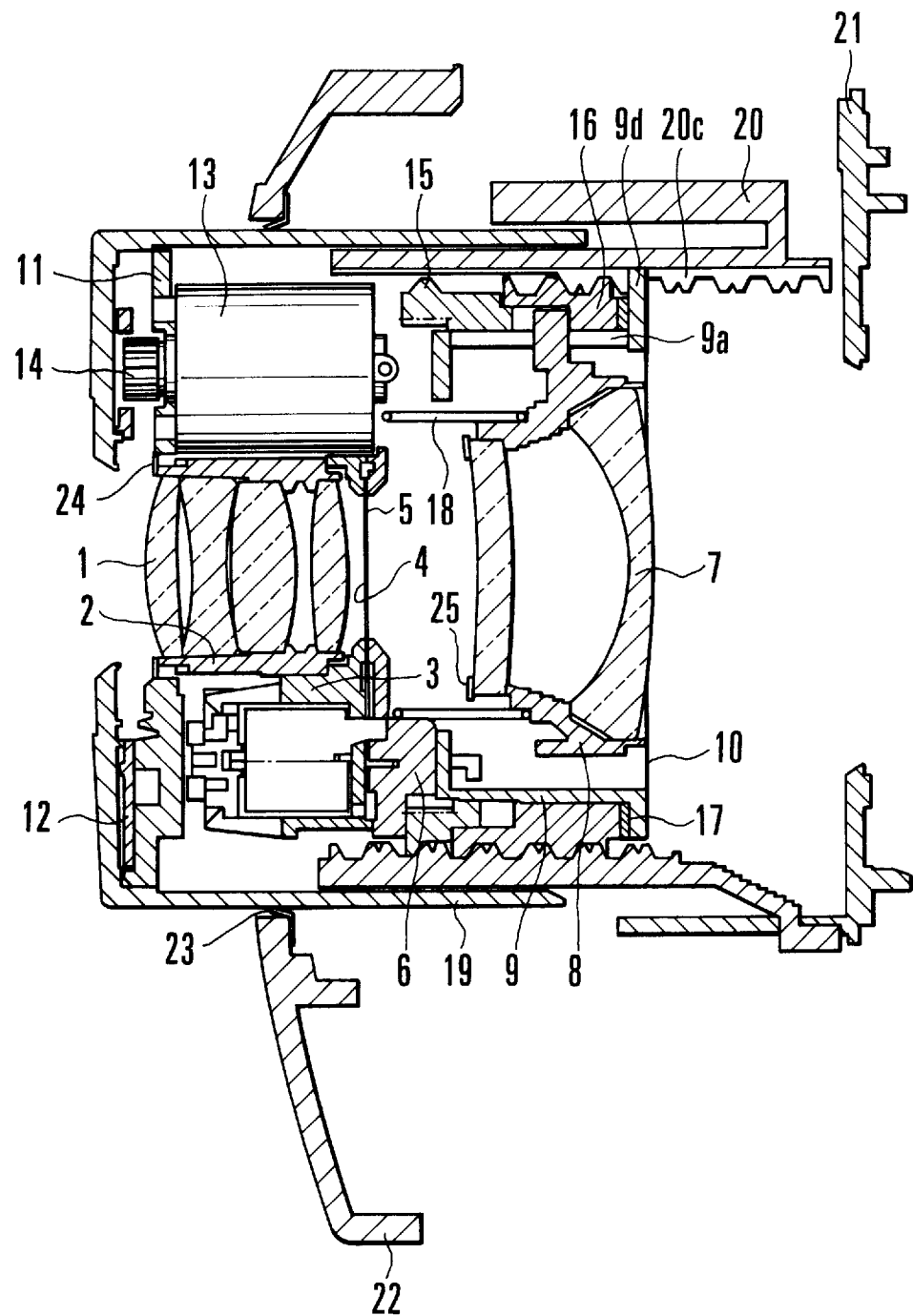
FIG. 2 is a diagrammatic cross-sectional view of the essential portion of the first embodiment, showing a state in which the relative position between a first lens group and a second-lens group is set to a wide-angle end.
Figure 3:
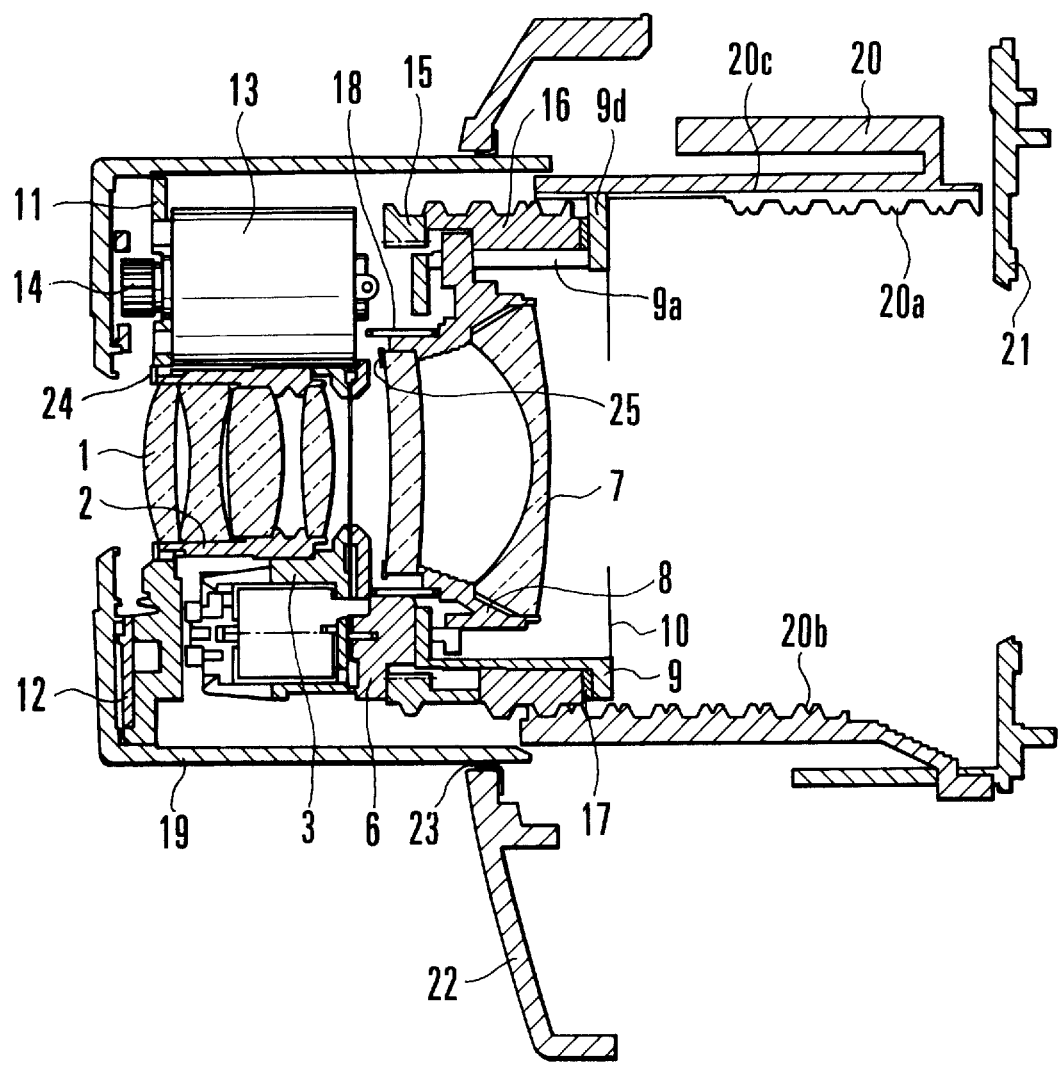
FIG. 3 is a diagrammatic cross-sectional view of the essential portion of the first embodiment, showing a state in which the relative position between the first lens group and the second lens group is set to a telephoto end.

FIGS. 1, 2 and 3 are diagrammatic cross-sectional views showing different states of the essential portion of a first embodiment of a camera (optical apparatus) having a lens barrel according to the present invention. FIG. 1 shows the retracted state of the lens barrel of the camera, FIG. 2 shows a state in which the relative position between a first lens group and a second lens group is set to a wide-angle end, and FIG. 3 shows the state in which the relative position between the first lens group and the second lens group is set to a telephoto end.

The camera shown in FIGS. 1 to 3 includes a first lens group 1 and a second lens group 7. The first lens group 1 and the second lens group 7 are made to travel along the optical axis so that the relative position between the first and second lens groups 1 and 7 is set to a predetermined zoom position at which an object image on a photosensitive plane (not shown) is formed. The camera illustrated also includes a first holder 2 which holds the first lens group 1, a first holding member 3 which holds the first holder 2, and shutter blades 4 and 5.

A second holding member 6 is secured to the first holding member 3 so that the shutter blades 4 and 5 are slidably held between the first holding member 3 and the second holding member 6. A second holder 8 holds the second lens group 7, and has three cam pins 8a, 8b and 8c which are located in abutment with a facial cam 16b which is formed to extend around the inner circumferential surface of a cam tube 16 which will be described later. A rectilinear guide member 9 is secured to the second holding member 6, and has rectilinear grooves 9a, 9b and 9c (the rectilinear grooves 9b and 9c are not shown) which respectively correspond to the cam pins 8a, 8b and 8c and which serve to prevent the second holder 8 from rotating about the optical axis and guide the second holder 8 along the optical axis, and a projection 9d which corresponds to a key groove 20c formed in a fixed tube 20 (to be described later) and which serves to prevent the first lens group 1 from rotating about the optical axis. A mask member 10 is secured to the rectilinear guide member 9, and serves to block an unwanted light flux outside an effective image plane which has passed through the first lens group 1 and the second lens group 7.

A base member 11 is secured to the first holding member 3, and a gear cover 12 is secured to the base member 11 and serves to cover a gear train which will be described later. A gear 14 is press-fitted on a pin projecting from a motor 13 and serves to transmit a driving force from the motor 13. A gear tube 15 has an inner gear 15a formed to extend around its inside-diameter portion, for transmitting the driving power from the motor 13, and is rotatably engaged with the outside-diameter portion of the rectilinear guide member 9.

Figure 4:
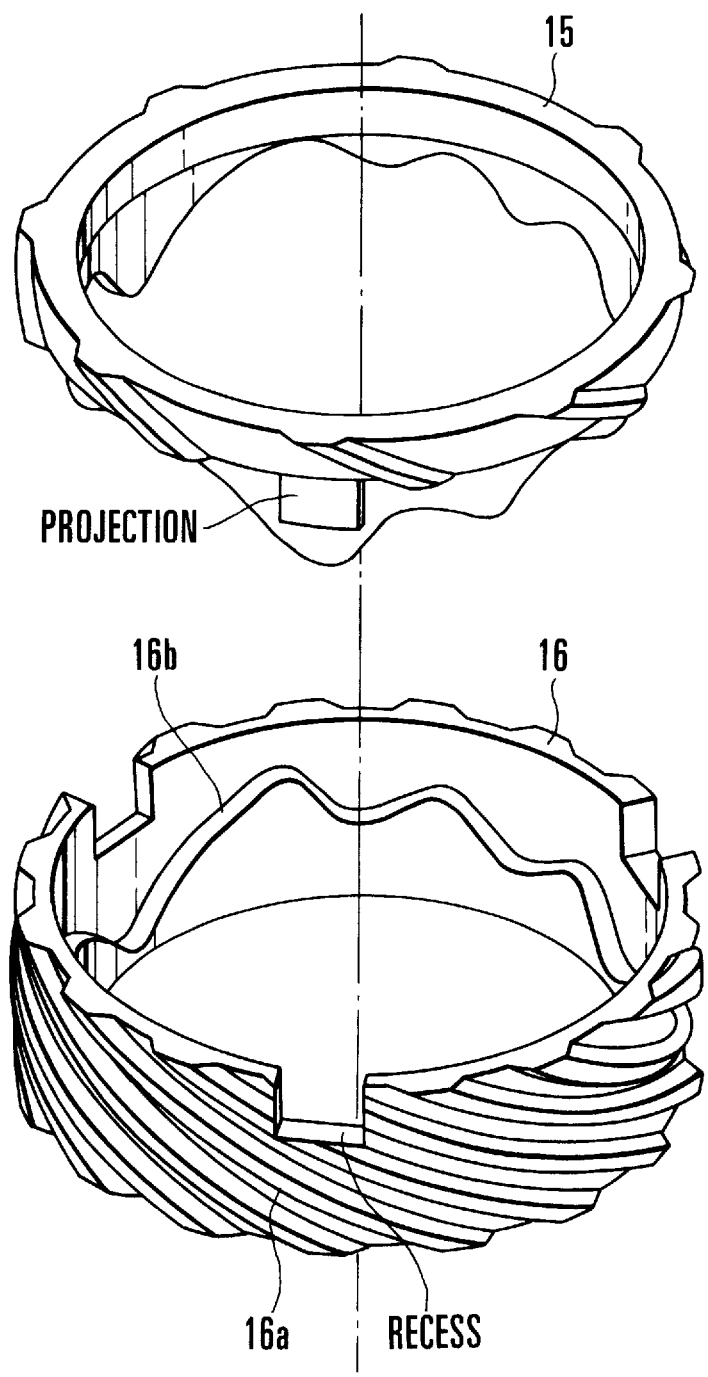
FIG. 4 is a diagrammatic perspective view of a gear tube and a cam tube used in the first embodiment.

As shown in FIG. 4, the cam tube 16 is integrally joined to the gear tube 15 by engaging the recesses of the cam tube 16 with the corresponding projections of the gear tube 15. The outside-diameter portion of the cam tube 16 has sixteen male helicoid parts 16a which are formed to engage with a female helicoid part 20a of the fixed tube 20. The inside-diameter portion of the cam tube 16 has the facial cam 16b which is formed to engage with the cam pins 8a, 8b and 8c of the second holder 8 and determine the position of the second lens group 7 in the direction of the optical axis. The inside-diameter portion of the cam tube 16 is rotatably engaged with the outside-diameter portion of the rectilinear guide member 9. A spring member 17 is inserted between the rectilinear guide member 9 and the cam tube 16, and serves to urge the cam tube 16 and the gear tube 15 which rotates integrally with the cam tube 16, toward the second holding member 6. A spring member 18 is provided for urging the cam pins 8a, 8b and 8c of the second holder 8 against the facial cam 16b of the cam tube 16. A lens-barrel cover 19 is secured to the base member 11.

The fixed tube 20 is secured to a camera body 21 via a mounting portion (not shown), and the inside-diameter portion of the fixed tube 20 has the female helicoid part 20a which meshes with the male helicoid parts 16a of the cam tube 16. The ridge portion of the female helicoid part 20a of the fixed tube 20 has a V-shaped groove 20b along its entire length. The key groove 20c which corresponds to the projection 9d of the rectilinear guide member 9 is formed in the inside-diameter portion of the fixed tube 20. An exterior member 22 is fixed in position by a mounting portion (not shown) of the camera body 21. A first sheet member 23 is secured to the inside of the exterior member 22, and serves to prevent foreign matter from entering from the outside. A second sheet member 24 is secured to the first holding member 3, and serves to prevent foreign matter or stray light from entering from an area around the first lens group 1. A third sheet member 25 is disposed around the periphery of the effective diameter of a plastic lens provided in the forefront of the second lens group 7, and is secured to the second holder 8.

Figure 5:
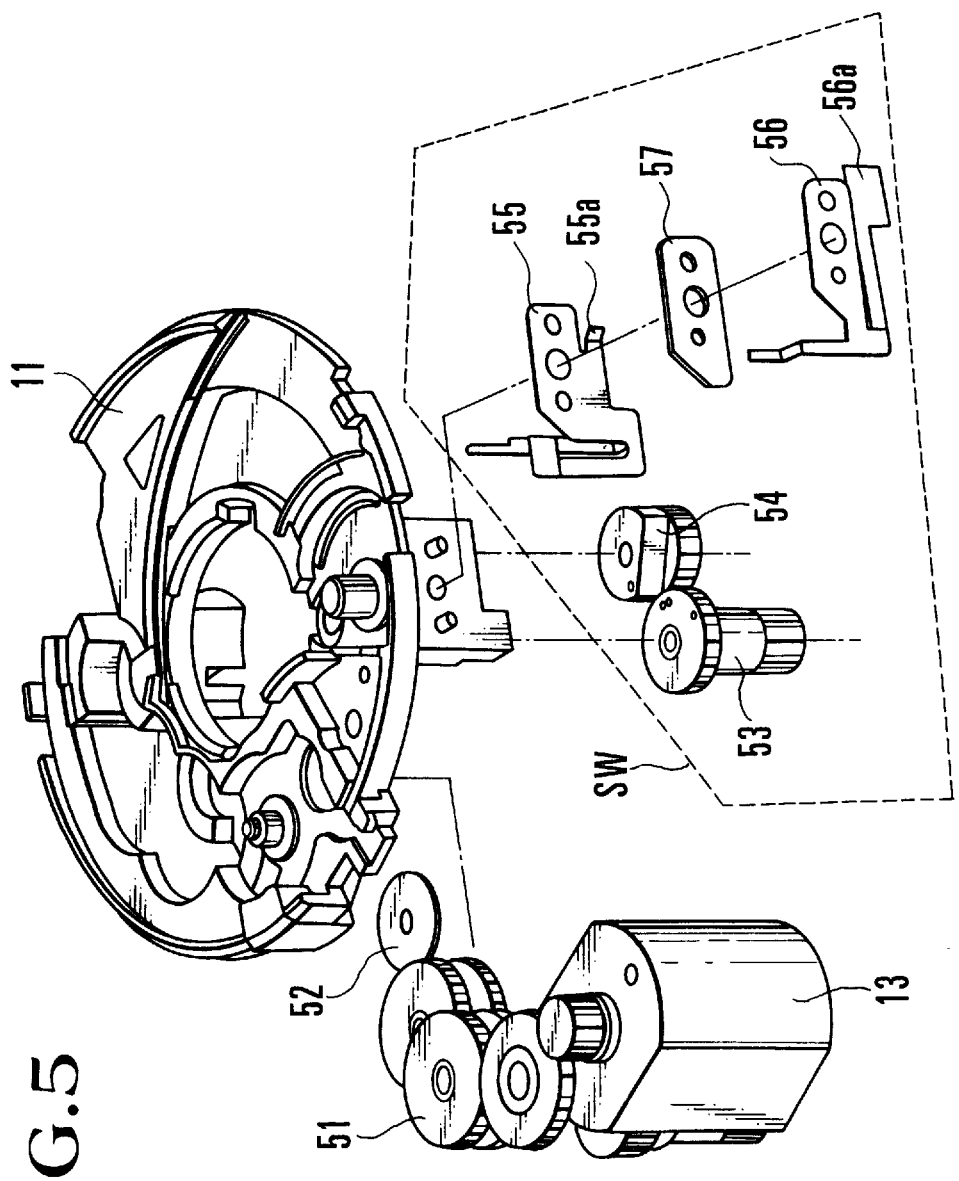
FIG. 5 is a schematic view showing a gear train and zoom-position detecting means.
Figure 6:
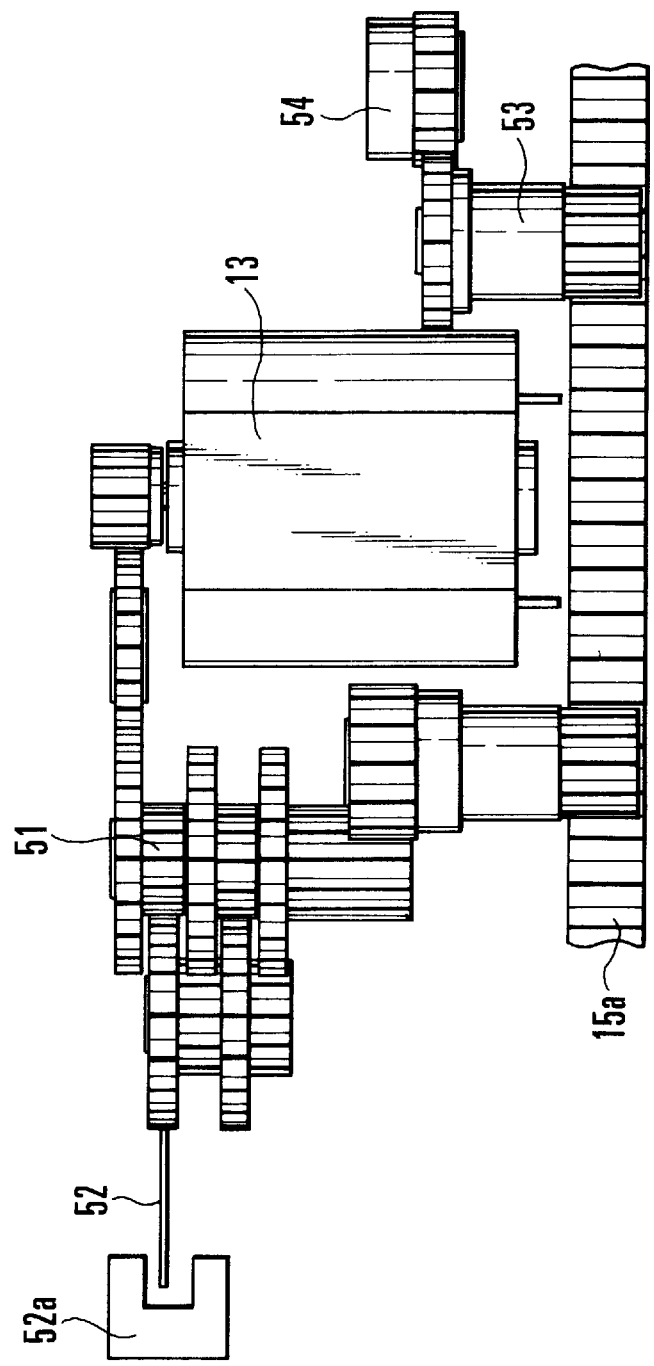
FIG. 6 is a explanatory view of the gear train.

The gear train covered with the gear cover 12 and zoom-position detecting means will be described below with reference to FIGS. 5 and 6. FIG. 5 is a schematic view showing the gear train covered with the gear cover 12 and the zoom-position detecting means, and FIG. 6 is a schematic explanatory view showing the gear train. In FIGS. 5 and 6, the gear train is denoted by reference numeral 51. A pulse plate 52 is arranged to be rotated by a gear disposed midway in the gear train 51. Pulse detecting means 52a is provided for detecting a pulse associated with the rotation of the pulse plate 52. The pulse plate 52 and the pulse detecting means 52a constitute rotation detecting means.

A first position detecting gear 53 is disposed at a position which is symmetrical to the final-stage gear of the gear train 51 about the rotating shaft of the motor 13. A second position detecting gear 54 forms a D-shaped cam for turning on and off a zoom detecting switch which will be described later. A first zoom detecting piece 55 and a second zoom detecting piece 56 are secured to the base member 11, and an insulating member 57 is sandwiched between the first zoom detecting piece 55 and the second zoom detecting piece 56. These constituent elements 53, 54, 55, 56 and 57 constitute the zoom-position detecting means.

In the operation of the first embodiment, if the motor 13 is activated when the lens barrel is in the retracted state of FIG. 1 during which photography is impossible, the rotating force of the motor 13 is transmitted from the gear 14 to the inner gear 15a of the gear tube 15 through the gear train 51, thereby rotating the cam tube 16 which is integrally joined to the gear tube 15 by engaging the recesses of the cam tube 16 with the corresponding projections of the gear tube 15. With the rotation of the cam tube 16, the first lens group 1 and the second lens group 7 travel along the optical axis by individual amounts each of which corresponds to the predetermined number of leads by which the cam tube 16 advances owing to the engagement between the male helicoid parts 16a provided on the outside-diameter portion of the cam tube 16 and the female helicoid part 20a of the fixed tube 20. During this time, the second lens group 7 travels along the optical axis by a predetermined lift of the facial cam 16b because the cam pins 8a, 8b and 8c of the second holder 8 are engaged with the facial cam 16b of the cam tube 16 and rotation of the second lens group 7 is prevented by the rectilinear grooves 9a, 9b and 9c (the rectilinear grooves 9b and 9c are not shown) of the rectilinear guide member 9.

The cam tube 16 is made to rotate in this manner, so that the first lens group 1 and the second lens group 7 travel forward (leftward as viewed in FIG. 1) while varying the space therebetween. FIG. 2 shows the state in which the first lens group 1 and the second lens group 7 are moved forward by the above-described operation (the state in which the relative position between the first lens group 1 and the second lens group 7 is set to the wide-angle end).

When the lens barrel is in the state of FIG. 1, the three cam pins 8a, 8b and 8c of the second holder 8 are respectively located at the positions ① shown in FIG. 7 within the facial cam 16b of the cam tube 16. When the cam tube 16 rotates from the state of FIG. 7 in the direction of the horizontal arrow shown in FIG. 7, the cam pins 8a, 8b and 8c respectively reach the positions ② shown in FIG. 8 (the wide-angle end).

According to the first embodiment, the camera is arranged so that photography is enabled at only four zoom positions within the entire zoom range which respectively correspond to the positions ②, ③, ④ and ⑤ shown in FIG. 8 at which to locate the cam pins 8a, 8b and 8c. In other words, the first embodiment is intended to enable photography not at continuous zoom positions but at four different focal lengths.

Referring to the cam pin 8a by way of example, when the cam pin 8a is located at the position ②, the relative position between the first and second lens groups 1 and 7 is set to the wide-angle end and an object lying at infinity is brought into focus. When the cam tube 16 rotates in the direction of the horizontal arrow shown in FIG. 8 and the cam pin 8a moves from the position ② to a position ②', an object lying at a closest distance is brought into focus with the relative position between the first and second lens groups 1 and 7 being set to the wide-angle end.

When the cam tube 16 further rotates in the direction of the horizontal arrow, the cam pin 8a passes through a cam portion 16c and reaches the position ③. When the cam pin 8a reaches the position ③, the relative position between the first and second lens groups 1 and 7 is set to a zoom position Z1 and an object lying at infinity is brought into focus. When the cam tube 16 further rotates in the direction of the horizontal arrow, the cam pin 8a moves from the position ③ to a position ③' at which an object lying at the closest distance is brought into focus with the relative position between the first and second lens groups 1 and 7 being set to the zoom position Z1.

When the cam tube 16 further rotates in the direction of the horizontal arrow, the cam pin 8a moves to the position ④ at which the relative position between the first and second lens groups 1 and 7 is set to a zoom position Z2 and an object lying at infinity is brought into focus. When the cam pin 8a moves to the position ⑤, the relative position between the first and second lens groups 1 and 7 is set to a zoom position Z3 (the telephoto end) and an object lying at infinity is brought into focus. The cam portion 16c and cam portions 16d, 16e and 16f are each formed to provide the same lead as the male helicoid parts 16a and the female helicoid part 20a, and the facial cam 16b is continuously formed in completely the same manner for each of the cam pins 8b and 8c as well.

Accordingly, when the cam tube 16 rotates from any of the positions ②, ③, ④ and ⑤, the first lens group 1 immediately travels forward by one lead by which the cam tube 16 is allowed to advance owing to the engagement between the male helicoid parts 16a and the female helicoid part 20a, while the second lens group 7 travels rearward by that one lead. Therefore, the second lens group 7 does not change its position, as viewed from the camera body 21.

Figure 9:
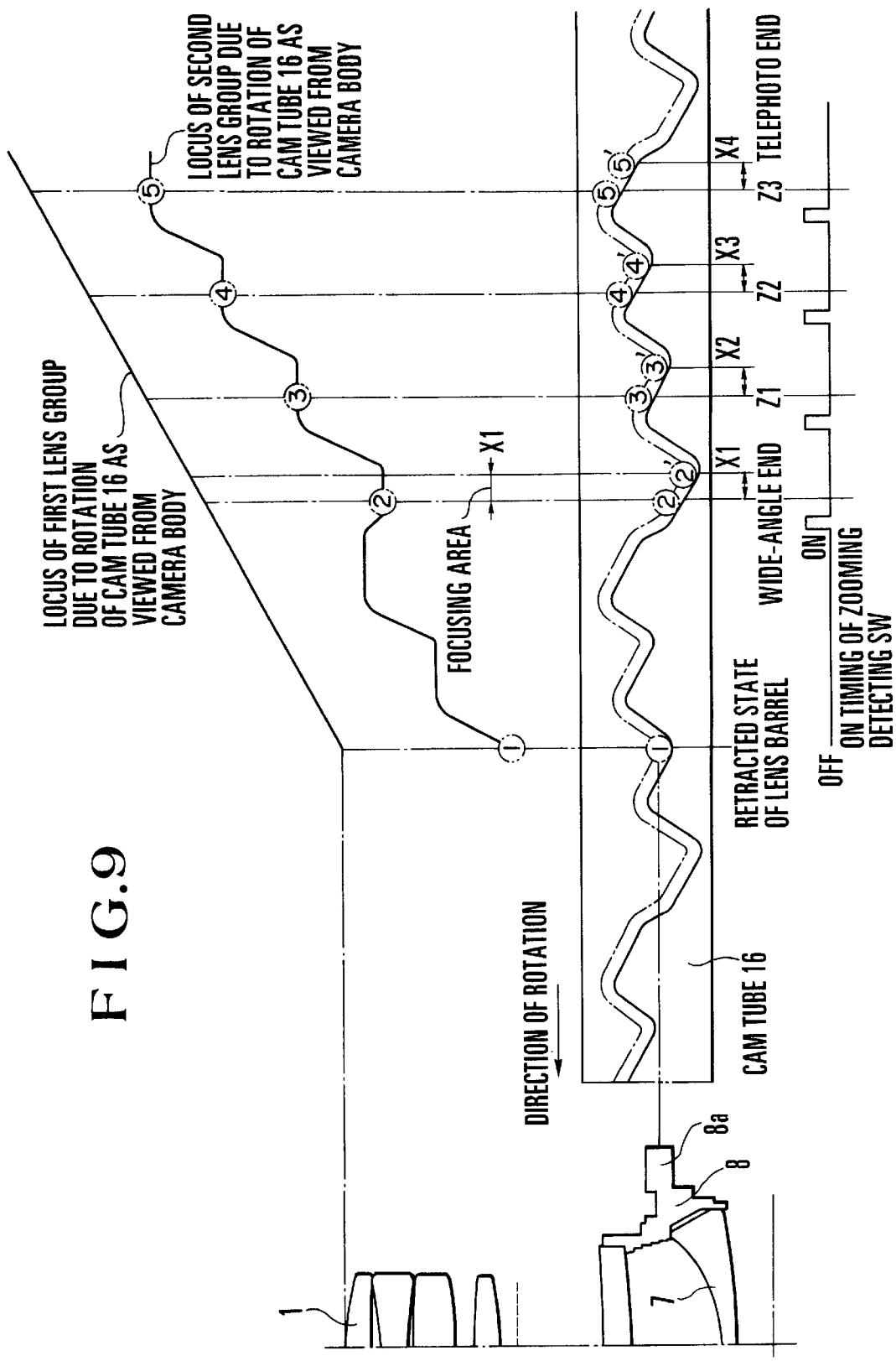
FIG. 9 is a diagram showing the movement loci of the first and second lens groups due to the rotation of the cam tube as viewed from the body of a camera.

In the first embodiment, during this time (when, for example, the cam pin 8a is moving in any of areas X1, X2, X3 and X4 of the respective cam portions 16c, 16d, 16e and 16f), an in-focus position is shifted from an object lying at infinity to an object lying at the closest distance. FIG. 9 shows the loci of the first and second lens groups 1 and 7 due to the above-described rotation of the cam tube 16 as viewed from the camera body 21.

In the first embodiment, the facial cam 16b is continuously formed to extend over an angle of 360 degrees around the inside-diameter portion of the cam tube 16, so that there is no one-to-one correspondence between the cam pins 8a, 8b and 8c and the cam face of the facial cam 16b.

It is also possible to reduce the diameter of the cam tube 16 by adopting an arrangement capable of increasing, when the lens barrel is in the retracted state of FIG. 1, the amount of rotation of the cam tube 16 by using the respective areas used by the adjacent cam pins for the purpose of zooming between the wide-angle end and the adjacent telephoto end.

The operation of detecting a zoom position during zooming in the first embodiment will be described below. The second position detecting gear 54 is set to make one rotation when the gear tube 15 and the cam tube 16 rotate from the position ② to the position ③ shown in FIG. 8. Since the rotational angle of each of the gear tube 15 and the cam tube 16 is the same between each of the positions ②, ③, ④ and ⑤ and the next one, the second position detecting gear 54 makes one rotation each time the gear tube 15 and the cam tube 16 rotate from any one of the zoom positions Z1, Z2 and Z3 to the next one.

Figure 10:
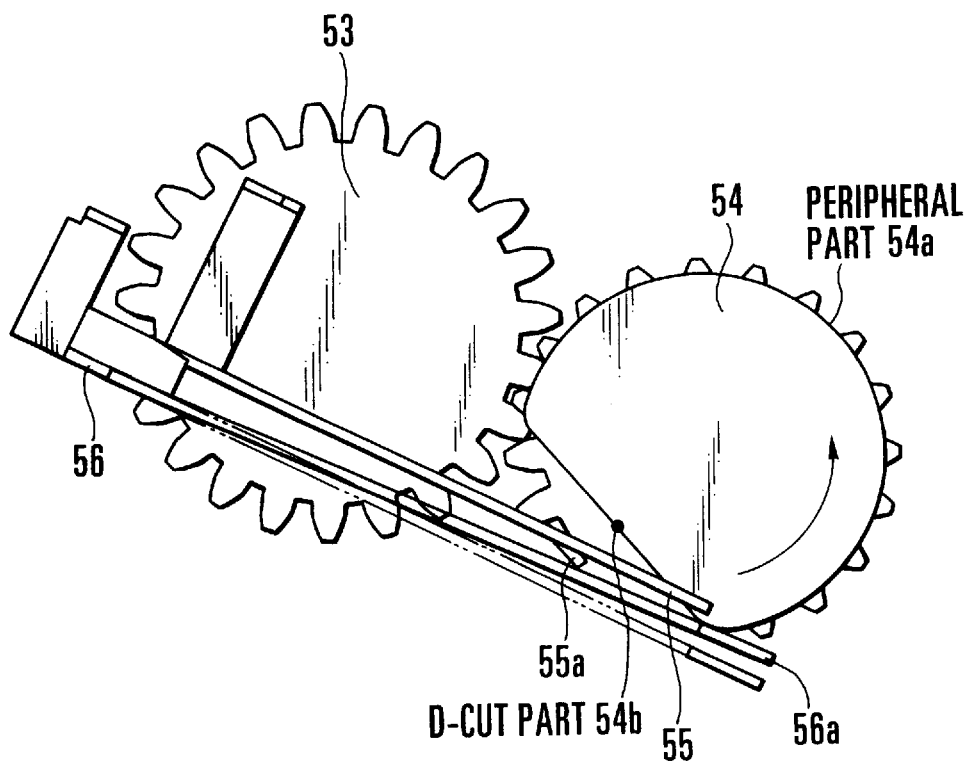
FIG. 10 is an explanatory view of zoom-position detecting means.

The first zoom detecting piece 55 shown in FIG. 10 has a contact part 55a for contact with a movable part 56a of the second zoom detecting piece 56.

The movable part 56a of the second zoom detecting piece 56 is located away from the contact portion 55a when in abutment with a peripheral part 54a of the D-shaped cam of the second position detecting gear 54. When the movable part 56a drops into a D-cut part 54b, the movable part 56a comes into contact with the contact portion 55a. In other words, each time a transition from any one of the zoom positions Z1, Z2 and Z3 to the next one occurs (each time the second position detecting gear 54 makes one rotation), a zoom detecting switch SW (the zoom-position detecting means) is turned on once. Accordingly, the zoom detecting switch SW generates a periodic signal.

The shape of the D-shaped cam is set so that the zoom detecting switch SW is turned on when the relative position between the first lens group 1 and the second lens group 7 takes a zoom position which deviates by a small amount toward the wide-angle end from each of the zoom positions (wide-angle end, Z1, Z2 and Z3) at which to bring an object lying at infinity into focus. When the zoom detecting switch SW is turned on and the zoom-position detecting means detects a transition from one zoom position to another through the signal supplied from the zoom detecting switch SW at this time, the relative position between the first and second lens groups 1 and 7 is returned toward the wide-angle side to a slight extent and the rotation of the cam tube 16 is stopped with the zoom detecting switch SW being off.

The on-off timing of the zoom detecting switch SW is also shown in FIG. 9.

In focusing, the cam tube 16 starts to rotate from the aforesaid stop position, and when the on timing of the zoom detecting switch SW is again detected, the number of pulses for focusing is counted by means of the pulse plate 52 and the pulse detecting means 52a and the position of a focusing lens (the first lens group 1) is detected.

According to the first embodiment, the rotation of the cam tube 16 is detected by means of the pulse plate 52 and the pulse detecting means 52a, and the zoom detecting switch SW and the first and second position detecting gears 53 and 54 are used so that the rotation of the cam tube 16 from one zoom position to the next is periodically detected. Accordingly, each time the cam tube 16 reaches any one of the zoom positions, the aforesaid pulse is reset to reduce the amount of deviation of each of the zoom positions at which to bring an object lying at infinity into focus, whereby accurate focusing control is effected.

Figure 11:
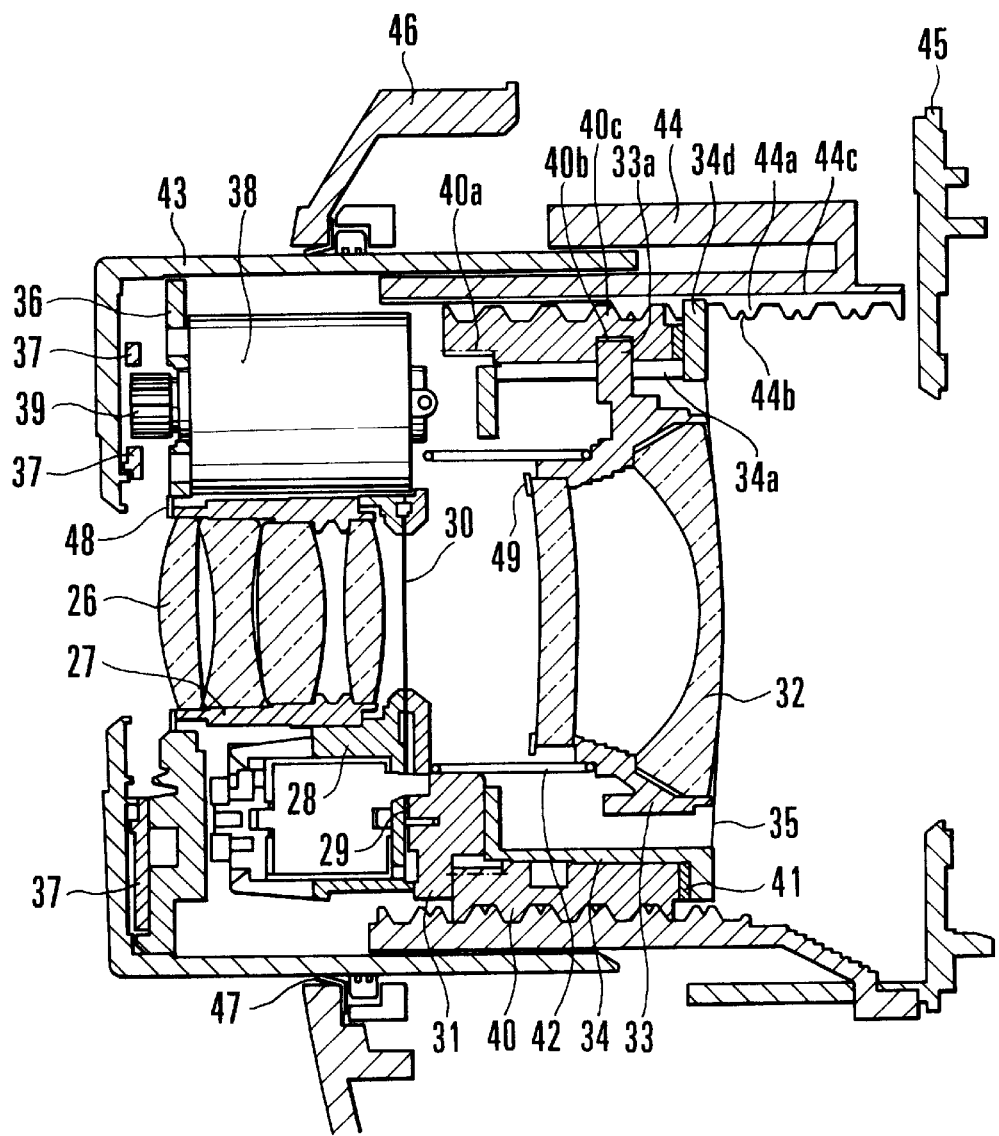
FIG. 11 is a diagrammatic cross-sectional view of the essential portion of a second embodiment of the present invention, showing a state in which the relative position between the first lens group and the second lens group is set to the wide-angle end.

FIG. 11 is a diagrammatic cross-sectional view of the essential portion of a second embodiment of the present invention, and shows a state in which the relative position between a first lens group and a second lens group is set to a wide-angle end.

The camera shown in FIG. 11 includes a first lens group 26 and a second lens group 32. The first lens group 26 and the second lens group 32 are made to travel along the optical axis so that the relative position between the first and second lens groups 26 and 32 is set to a predetermined zoom position. The camera illustrated also includes a first holder 27 which holds the first lens group 26, a first holding member 28 which holds the first holder 27, and shutter blades 29 and 30.

A second holding member 31 is secured to the first holding member 28 so that the shutter blades 29 and 30 are slidably held between the first holding member 28 and the second holding member 31. A second holder 33 holds the second lens group 32, and has three cam pins, 33a, 33b and 33c which are located in abutment with a groove cam 40b which is formed to extend around the inner circumferential surface of a cam tube 40 which will be described later. A rectilinear guide member 34 is secured to the second holding member 31, and has rectilinear grooves 34a, 34b and 34c (the rectilinear grooves 34b and 34c are not shown) which respectively correspond to the cam pins 33a, 33b and 33c and which serve to prevent the second holder 33 from rotating about the optical axis and guide the second holder 33 along the optical axis, and a projection 34d which corresponds to a key groove 44c formed in a fixed tube 44 (to be described later) and which serves to prevent the first lens group 26 from rotating about the optical axis. A mask member 35 is secured to the rectilinear guide member 34, and serves to block an unwanted light flux outside an effective image plane which has passed through the first lens group 26 and the second lens group 32.

A base member 36 is secured to the first holding member 28, and a gear cover 37 is secured to the base member 36 and serves to cover a gear train (not shown). A gear 39 is press-fitted on a pin projecting from a motor 38.

The outside-diameter portion of the cam tube 40 has sixteen male helicoid parts 40c which are formed to engage with female helicoid parts 44a of the fixed tube 44. The inside-diameter portion of the cam tube 40 has the groove cam 40b which is formed to engage with the cam pins 33a, 33b and 33c of the second holder 33 and determine the position of the second lens group 32 in the direction of the optical axis. The inside-diameter portion of the cam tube 40 is rotatably engaged with the outside-diameter portion of the rectilinear guide member 34. A spring member 41 is inserted between the rectilinear guide member 34 and the cam tube 40, and serves to urge the cam tube 40 toward the second holding member 31. A spring member 42 is provided for urging the cam pins 33a, 33b and 33c of the second holder 33 against the groove cam 40b of the cam tube 40. A lens-barrel cover 43 is secured to the base member 36.

The fixed tube 44 is secured to a camera body 45 via a mounting portion (not shown), and the inside-diameter portion of the fixed tube 44 has the sixteen female helicoid parts 44a which mesh with the male helicoid parts 40c of the cam tube 40. The ridge portion of each of the female helicoid parts 44a has a V-shaped groove 44b along its entire length. The key groove 44c which corresponds to the projection 34d of the rectilinear guide member 34 is formed in the inside-diameter portion of the fixed tube 44. An exterior member 46 is fixed in position by a mounting portion (not shown) of the camera body 45. A first sheet member 47 is secured to the inside of the exterior member 46, and serves to prevent foreign matter from entering from the outside. A second sheet member 48 is secured to the first holding member 28, and serves to prevent foreign matter or stray light from entering from an area around the first lens group 26. A third sheet member 49 is disposed around the periphery of the effective diameter of a plastic lens provided in the forefront of the second lens group 32, and is secured to the second holder 33.

In the operation of the second embodiment, if the motor 38 is activated, the rotating force of the motor 38 is transmitted from the gear 39 to the inner gear 40a of the cam tube 40 through the gear train (not shown), thereby rotating the cam tube 40. With the rotation of the cam tube 40, the first lens group 26 and the second lens group 32 travel along the optical axis by individual amounts each of which corresponds to the predetermined number of leads by which the cam tube 40 advances owing to the engagement between the male helicoid parts 40c provided on the outside-diameter portion of the cam tube 40 and the female helicoid parts 44a of the fixed tube 44. During this time, the second lens group 32 travels along the optical axis by a predetermined lift of the groove cam 40b because the cam pins 33a, 33b and 33c of the second holder 33 are engaged with the groove cam 40b of the cam tube 40 and rotation of the second lens group 32 is prevented by the rectilinear grooves 34a, 34b and 34c (the rectilinear grooves 34b and 34c are not shown) of the rectilinear guide member 34.

The cam tube 40 is made to rotate in this manner, so that the first lens group 26 and the second lens group 32 travel forward (leftward as viewed in FIG. 11) while varying the space therebetween.

When the lens barrel is in the state of FIG. 11, the three cam pins 33a, 33b and 33c of the second holder 33 are respectively located at the positions ① shown in FIG. 12 within the groove cam 40b of the cam tube 40. When the cam tube 40 rotates from the state of FIG. 12 in the direction of the horizontal arrow shown in FIG. 12, the cam pins 33a, 33b and 33c respectively reach the positions ② shown in FIG. 13 (the wide-angle end).

Then, when the cam tube 40 further rotates in the direction of the horizontal arrow, for example, the cam pin 33a passes through a cam portion 40d and reaches a position ③. When the cam tube 40 further rotates in the direction of the horizontal arrow, the cam pin 33a moves to a position ④ and then to a position ⑤. The cam portion 40d and cam portions 40e, 40f and 40g are each formed to provide the same lead as the male helicoid parts 40c and the female helicoid parts 44a, and the groove cam 40b is continuously formed in completely the same manner for each of the cam pins 33b and 33c as well.

Accordingly, similarly to the case of the above-described first embodiment, when the cam tube 40 rotates from any of the positions ②, ③, ④ and ⑤, the first lens group 26 immediately travels forward by one lead by which the cam tube 40 is allowed to advance owing to the engagement between the male helicoid parts 40c and the female helicoid parts 44a, while the second lens group 32 travels rearward by that one lead. Therefore, the second lens group 32 does not change its position, as viewed from the camera body 45.

In the second embodiment, during this time (when, for example, the cam pin 33a is moving in any of the cam portions 40d, 40e, 40f and 40g), a focusing operation is carried out.

In the second embodiment, the groove cam 40b is continuously formed to extend over an angle of 360 degrees around the inside-diameter portion of the cam tube 40, so that there is no one-to-one correspondence between the cam pins 33a, 33b and 33c and the cam groove of the groove cam 40b.

It is also possible to reduce the diameter of the cam tube 40 by adopting an arrangement capable of increasing, when the lens barrel is in the retracted state of FIG. 11, the amount of rotation of the cam tube 40 by using the respective areas used by the adjacent cam pins for the purpose of zooming between the wide-angle end and the adjacent telephoto end.

Incidentally, in the second embodiment as well, it is possible to detect a zoom position by using an arrangement similar to that used in the first embodiment.

FIGS. 14 and 15 are schematic views showing the essential portion of a facial cam which is formed to extend around the inner circumferential surface of a cam tube according to a third embodiment of the present invention.

Figure 16:
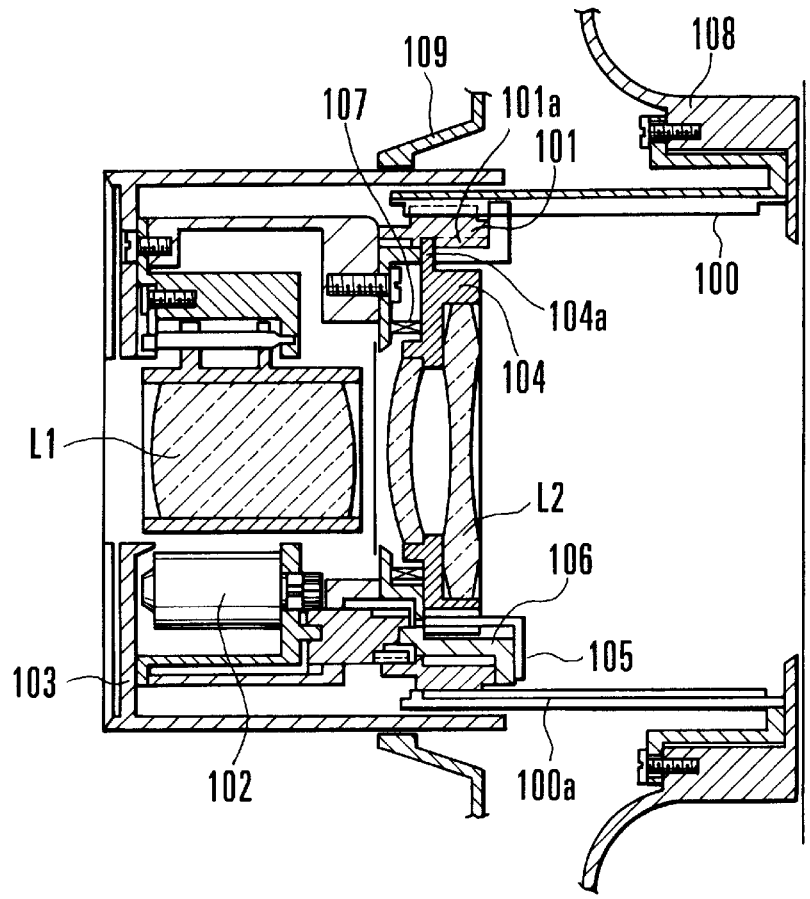
FIG. 16 is a schematic cross-sectional view of the essential portion of a conventional lens barrel.
Figure 17:
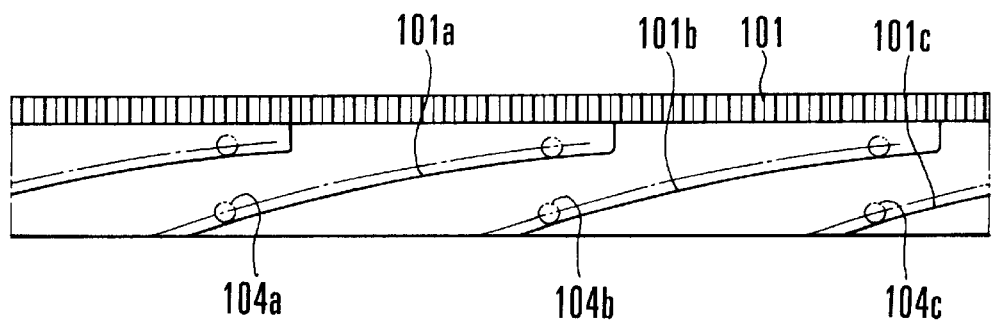
FIG. 17 is a schematic exploded view of the inside face of the cam tube shown in FIG. 16.

According to the third embodiment, unlike the facial cam 16b of FIG. 8 used in the first embodiment, the focusing cam portions 16c, 16d, 16e and 16f are eliminated and only the facial cam 16b is formed as a zoom cam portion which continuously extends over an angle of 360 degree around the inside-diameter portion of the cam tube. Specifically, the third embodiment has a construction in which the present invention is applied to a lens barrel having the construction shown in FIG. 16, whereby a zoom lens barrel of small size can be provided.

Incidentally, the positions ②, ③, ④ and ⑤ shown in FIG. 15 correspond to the positions ②, ③, ④ and ⑤ shown in FIG. 8, respectively.

What is claimed is:

1. A lens barrel comprising:
    a first lens unit;
    a cam tube provided with a cam;
    a plurality of cam followers arranged to move integrally with said first lens unit and follow respective cam parts of said cam; and
    moving means for moving said cam tube along an optical axis with a rotation of said cam tube,
    wherein a cam part to which at least one cam follower of said plurality of cam followers corresponds is connected to a cam part to which another one of said plurality of cam followers adjacent to said at least one cam follower corresponds, and said at least one cam follower follows the cam part of said adjacent cam follower.

2. A lens barrel according to claim 1, wherein said cam is an endless cam.

3. A lens barrel according to claim 1, further comprising:
    a second lens unit; and
    a fixed tube,
    wherein said moving means moves said cam tube to cause said first and second lens units to travel with respect to said fixed tube.

4. A lens barrel according to claim 3, wherein said fixed tube has a first helicoid part on its inside-diameter portion and said cam tube has on its outside-diameter portion a second helicoid part engaged with said first helicoid part, said moving means including said first helicoid part and said second helicoid part.

5. A lens barrel according to claim 4, further comprising:
    zoom-position detecting means; and
    rotation detecting means for detecting the rotation of said cam tube.

6. A lens barrel according to claim 1, further comprising a rectilinear groove for limiting the rotation of said first lens unit.

7. A lens barrel comprising:
    a first lens unit;
    a cam tube having an endless cam;
    a plurality of cam followers arranged to move integrally with said first lens unit and follow said cam; and
    moving means for moving said cam tube along an optical axis with a rotation of said cam tube.

8. A lens barrel according to claim 7, further comprising:

a second lens unit; and a fixed tube, wherein said moving means moves said cam tube to cause said first and second lens unit to travel with respect to said fixed tube.

9. A lens barrel according to claim 8, wherein said fixed tube has a first helicoid part on its inside-diameter portion, and said cam tube has on its outside-diameter portion a second helicoid part engaged with said first helicoid part, said moving means including said first helicoid part and said second helicoid part.

10. A lens barrel according to claim 9, further comprising:

zoom-position detecting means; and rotation detecting means for detecting the rotation of said cam tube.

11. A lens barrel according to claim 7, further comprising a rectilinear groove for limiting the rotation of said first lens unit.

12. An optical apparatus comprising:

a first lens unit;

a cam tube provided with a cam;

a plurality of cam followers arranged to move integrally with said first lens unit and follow respective cam parts of said cam; and moving means for moving said cam tube along an optical axis with a rotation of said cam tube, wherein a cam part to which at least one cam follower of said plurality of cam followers corresponds is connected to a cam part to which another one of said plurality of cam followers adjacent to said at least one cam follower corresponds, and said at least one cam follower follows the cam part of said adjacent cam follower.

13. An optical apparatus according to claim 12, wherein said cam is an endless cam.

14. An optical apparatus according to claim 12, further comprising:

a second lens unit; and a fixed tube, wherein said moving means moves said cam tube to cause said first and second lens units to travel with respect to said fixed tube.

15. An optical apparatus according to claim 12, wherein said fixed tube has a first helicoid part on its inside-diameter portion and said cam tube has on its outside-diameter portion a second helicoid part engaged with said first helicoid part, said moving means including said first helicoid part and second helicoid part.

16. An optical apparatus according to claim 15, further comprising:

zoom-position detecting means; and rotation detecting means for detecting the rotation of said cam tube.

17. An optical apparatus according to claim 12, further comprising a rectilinear groove for limiting the rotation of said first lens unit.

18. An optical apparatus according to claim 12, wherein a cam part to which at least one cam follower of said plurality of cam follower corresponds retracts a lens barrel by using a cam part to which a cam follower adjacent to said at least one cam follower corresponds.

19. An optical apparatus comprising:

a first lens unit;

a cam tube having an endless cam;

a plurality of cam followers arranged to move integrally with said first lens unit and follow respective cam parts of said cam; and moving means for moving said cam tube along an optical axis with a rotation of said cam tube.

20. An optical apparatus according to claim 19, further comprising:

a second lens unit; and a fixed tube, wherein said moving means moves said cam tube to cause said first and second lens units to travel with respect to said fixed tube.

21. An optical apparatus according to claim 20, wherein said fixed tube has a first helicoid part on its inside-diameter portion, and said cam tube has on its outside-diameter portion a second helicoid part engaged with said first helicoid part, said moving means including said first helicoid part and second helicoid part.

22. An optical apparatus according to claim 21, further comprising:

zoom-position detecting means; and rotation detecting means for detecting the rotation of said cam tube.

23. An optical apparatus according to claim 19, further comprising a rectilinear groove for limiting the rotation of said first lens unit.

24. An optical apparatus according to claim 19, wherein a cam part to which at least one cam follower of said plurality of cam follower corresponds retracts a lens barrel by using a cam part to which a cam follower adjacent to said at least one cam follower corresponds.

25. A lens barrel, comprising:

a lens unit, a cam tube, a first cam follower which moves together with the lens unit and follows a cam part formed in the cam tube, and a second cam follower which moves together with the lens unit and follows the cam part formed in the cam tube, wherein the cam tube rotates to move the lens unit in the optical axis direction, and a cam portion which the first cam follower follows overlaps partially with a cam portion which the second cam follower follows.

* * * * *

UNITED STATES PATENT AND TRADEMARK OFFICE
CERTIFICATE OF CORRECTION

PATENT NO. : 5,870,232
DATED : February 9, 1999
INVENTOR(S) : KANJI TSUJI, ET AL.

It is certified that error appears in the above-identified patent and that said Letters Patent is hereby corrected as shown below: On the title page:

<u>At [75] Inventors:</u>

"Kanji Tsuji; Akihiro Namai, both of Kanagawa-ken, Japan" should read --Kanji Tsuji, Yokohama; Akihiro Namai, Kawasaki, both of Japan--.

<u>Column 1</u>

Line 54, "110a" should read --101a--.

<u>Column 3</u>

Line 4, "second-lens" should read --second lens--.
Line 18, "Lube" should read --tube--.
Line 61, "shown)is" should read --shown) is--.

Signed and Sealed this

Fourteenth Day of September, 1999

*Attest:*

Q. TODD DICKINSON

*Attesting Officer*     *Acting Commissioner of Patents and Trademarks*